United States Patent [19]

Beadle et al.

[11] Patent Number: 5,566,582
[45] Date of Patent: Oct. 22, 1996

[54] SELECTOR MECHANISM FOR A VEHICLE TRANSMISSION

[75] Inventors: David E. Beadle, Southam; Mahesh Chauhan, Coventry; John S. Ebrey, Redditch; Iorwerth D. Lewis, Grovesend; Robin C. Powell, Harpole; Robert J. Railton, Birmingham; Michael Robinson, Loughor; Alan F. Sheppard, Hunt End, all of United Kingdom

[73] Assignee: Rover Group Limited, Birmingham, England

[21] Appl. No.: 334,878

[22] Filed: Nov. 4, 1994

[30] Foreign Application Priority Data

Nov. 5, 1993 [GB] United Kingdom ............... 9322836

[51] Int. Cl.⁶ .................................................. B60K 20/06
[52] U.S. Cl. .......................... 74/475; 74/335; 74/473 R; 74/538; 180/333; 180/336; 192/4 A
[58] Field of Search ....................... 74/557, 335, 473 R, 74/475, 477, 471, 528, 529, 543, 575, 538, 545; 180/315, 333, 334, 335, 336; 192/4 A

[56] References Cited

U.S. PATENT DOCUMENTS

| | | | |
|---|---|---|---|
| 4,191,064 | 3/1980 | Houk et al. ............................. | 74/475 |
| 4,228,879 | 10/1980 | Woodbury ............................. | 74/475 X |
| 4,326,432 | 4/1982 | Miller . | |
| 4,442,730 | 4/1984 | Snoy . | |
| 4,463,623 | 8/1984 | Miyata et al. . | |
| 4,720,793 | 1/1988 | Watanabe et al. ..................... | 477/48 X |
| 4,986,143 | 1/1991 | Livshits et al. ......................... | 74/475 |
| 4,987,792 | 1/1991 | Mueller et al. . | |
| 5,044,220 | 9/1991 | Raff et al. . | |
| 5,070,740 | 12/1991 | Giek et al. . | |
| 5,184,523 | 2/1993 | Nyzedatny . | |
| 5,309,783 | 5/1994 | Doolittle et al. ....................... | 74/475 X |
| 5,372,050 | 12/1994 | Shinki et al. ........................ | 180/336 X |
| 5,406,860 | 4/1995 | Easton et al. ............................. | 74/335 |
| 5,415,056 | 5/1995 | Tabata et al. ..................... | 74/473 R X |

FOREIGN PATENT DOCUMENTS

| | | |
|---|---|---|
| 0207260 | 1/1987 | European Pat. Off. . |
| 0429193 | 5/1991 | European Pat. Off. . |
| 0437150 | 7/1991 | European Pat. Off. . |
| 2298827 | 8/1976 | France . |
| 1546461 | 5/1979 | United Kingdom . |
| 2153458 | 8/1985 | United Kingdom . |
| 90/04225 | 4/1990 | WIPO . |

OTHER PUBLICATIONS

Road and Track, vol. 41, No. 3, Nov. 1989, "One–Upmanship".

Primary Examiner—Charles A. Marmor
Assistant Examiner—Saul Rodriguez
Attorney, Agent, or Firm—Davis and Bujold

[57] ABSTRACT

A selector mechanism for a vehicle transmission comprising an automatic transmission coupled to a range-change transmission having first and second ranges includes a ratio selector lever movable along three paths defined by an H-shaped gaze. The first path is defined by a first limb of the gate for shift selection in the automatic transmission with the first range of the range-change transmission selected. The second path is defined by a second limb of the gate substantially parallel with the first limb for shift selection in the automatic transmission with the second range of the range-change transmission selected and the third, transverse, path is defined by a limb of the gate transverse to the first and second limbs. Movement of the selector lever along the transverse path effects a change from one range to the other in the range-change transmission.

18 Claims, 7 Drawing Sheets

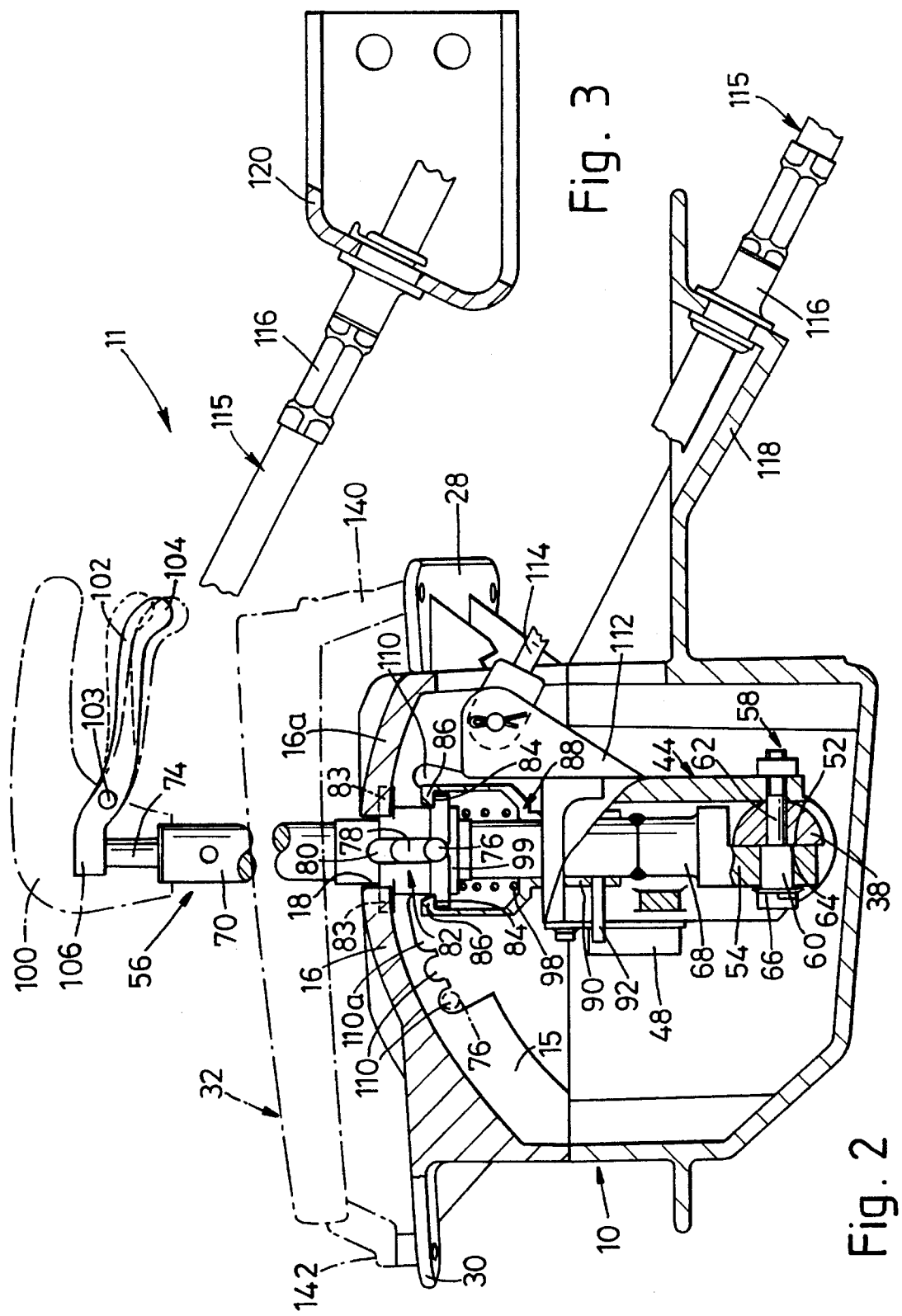

SELECTOR MECHANISM FOR A VEHICLE TRANSMISSION

The invention relates to a selector mechanism for a vehicle transmission and is particularly concerned with a selector mechanism for a vehicle transmission which comprises an automatic transmission and a range-change transmission.

Vehicles having an automatic transmission and a range-change transmission (typically four wheel drive vehicles) usually have a first selector lever for selecting shift positions in the automatic transmission and a second selector lever for effecting a ratio change in the range-change transmission, with such an arrangement, the driver has the problem of manipulating two selector levers and an object of the present invention is to provide a selector mechanism where that particular problem is avoided.

According to the invention there is provided a selector mechanism for a vehicle transmission which comprises an automatic transmission drivingly coupled to a range-change transmission having first and second selectable ranges, the selector mechanism comprising a support and a driver operable selector lever constrained by the support for movement along a first path for shift selection in the automatic transmission with the first range of the range-change transmission selected, along a second path substantially parallel to the first path for shift selection in the automatic transmission with the second range of the range-change transmission selected and along a third path transverse to the first and second paths whereby movement of the selector lever along the transverse path effects a change from one range to the other in the range-change transmission.

With such an arrangement, a single selector lever only is necessary to enable shift positions to be selected for the automatic transmission and for a range change to be made in the range-change transmission.

Preferably the selector mechanism is arranged so than the transverse path intersects the first and second paths at positions coincident with a neutral shift position for the automatic transmission. Conveniently, a neutral condition can be selected in the range-change transmission by positioning the selector lever at an intermediate position along the transverse path.

Means may be provided for optionally maintaining the lever in an intermediate position along the transverse path. This can be used to place the range-change transmission and preferably the automatic transmission in a neutral condition to enable the vehicle to be towed.

Selector release means may be provided on the selector lever for manipulation by the driver to permit shift selections to be made in each of the first and second paths, in which case a detent mechanism may be provided for locating the selector lever at positions in the support corresponding to selected shift positions, the selector release means being movable to disengage the detent mechanism. Such a detent mechanism may comprise a latching member carried by the selector lever and which is locatable in a series of recesses in the support to hold the selector lever in a required shift position, operation of the selector release means being arranged to disengage the latching member from one recess so as to permit relocation thereof in another recess. Resilient means such as a detent spring may cooperate with the selector release means such that the selector release means requires movement against the bias of the detent spring when disengaging the detent mechanism.

A releasable blocking means may be operable to prevent movement of the selector lever from one of said first and second paths and along the transverse path to effect a range-change. Preferably, the selector release means requires a first level of manipulation to enable shift selections of the selector lever to be made in each of said first and second paths and a second level of manipulation to be made to enable the selector lever to be moved along said transverse path to effect a range change. For example, a blocking spring may cooperates with the selector release means such that the selector release means requires further movement against the bias of the blocking spring after overcoming the bias of the detent spring to enable the selector lever to be moved along the transverse path to effect a range-change.

A stop may be provided to indicate to the driver that the selector release means has been moved against the bias of the detent spring by an amount sufficient to enable the selector lever to be moved along the first or the second path. In such a case, the stop may be movable against the bias of the blocking spring by continued operation of the selector release means to enable the selector lever to be moved along the transverse path to effect a range change.

The releasable blocking means may comprise a blocking member arranged to co-operate with a surface of the support to prevent movement of the selector lever along the transverse path, the blocking member being movable by the selector release means to a position in which the blocking member clears the said surface to permit movement of the selector lever along the transverse path. In that way, it is be difficult for the driver to move the selector lever along the transverse path accidentally as such movement requires a positive manipulation of the selector release means to move the blocking member out of the blocking position.

The means for optionally maintaining the selector lever in the intermediate position along the transverse path may be arranged to lie between two surfaces of the support in which are formed recesses corresponding to shift positions for the selector lever when in first and second paths, in which case release means may be operable by the driver to move the said means for optionally maintaining the selector lever in the intermediate-position to a position in which it allows the selector lever to move out of the intermediate position and into the first or second path. Preferably said release means is the selector release means.

Conveniently, the means for maintaining the selector lever in position along the transverse path comprises the latching member.

The selector mechanism may include a cover having an opening corresponding substantially to the shape of the paths and a movable blind adjacent to and arranged to obscure the opening, the selector lever extending through the cover and the blind and being arranged to rotate the blind as the selector lever is moved along the said paths. Preferably, the blind has a substantially radial slot and a plate is slidably mounted on the blind so as to substantially cover the slot, the selector lever extending through an aperture in the plate. The cover may be part of a console having a mode selection switch thereon for selecting transmission modes in the automatic transmission.

Switch means may be provided for operation when the selector lever is moved from the first path to the second path or vice versa, the switch means being arranged to control the selection of the ranges in the range change transmission. Conveniently said switch means comprises two switches, e.g. microswitches, one of which operates to cause selection of the first range in the range-change transmission when the selector lever is positioned for movement along the first path and the other of which operates to cause selection of the second range in the range-change transmission when the selector lever is positioned for movement along the second path. Both switches may be in the same state when the selector lever is positioned at an intermediate position along the transverse path to cause the range-change transmission to select a neutral condition, e.g. for towing.

A releasable stop means, such as a solenoid operated pin, may be provided for maintaining the selector lever in a given shift position such as a Park position until a signal is received to release the stop means. This can be used to ensure that the selector lever cannot be moved from the Park position until, for example, the driver applies the foot brake of the vehicle.

A selector mechanism for a vehicle transmission will now be described by way of example with reference to the accompanying drawings, in which:

FIG. 2 is a cross-section of the mechanism shown in FIG. 1 on the line II—II in FIG. 1;

through part of a vehicle on

Figure 1:
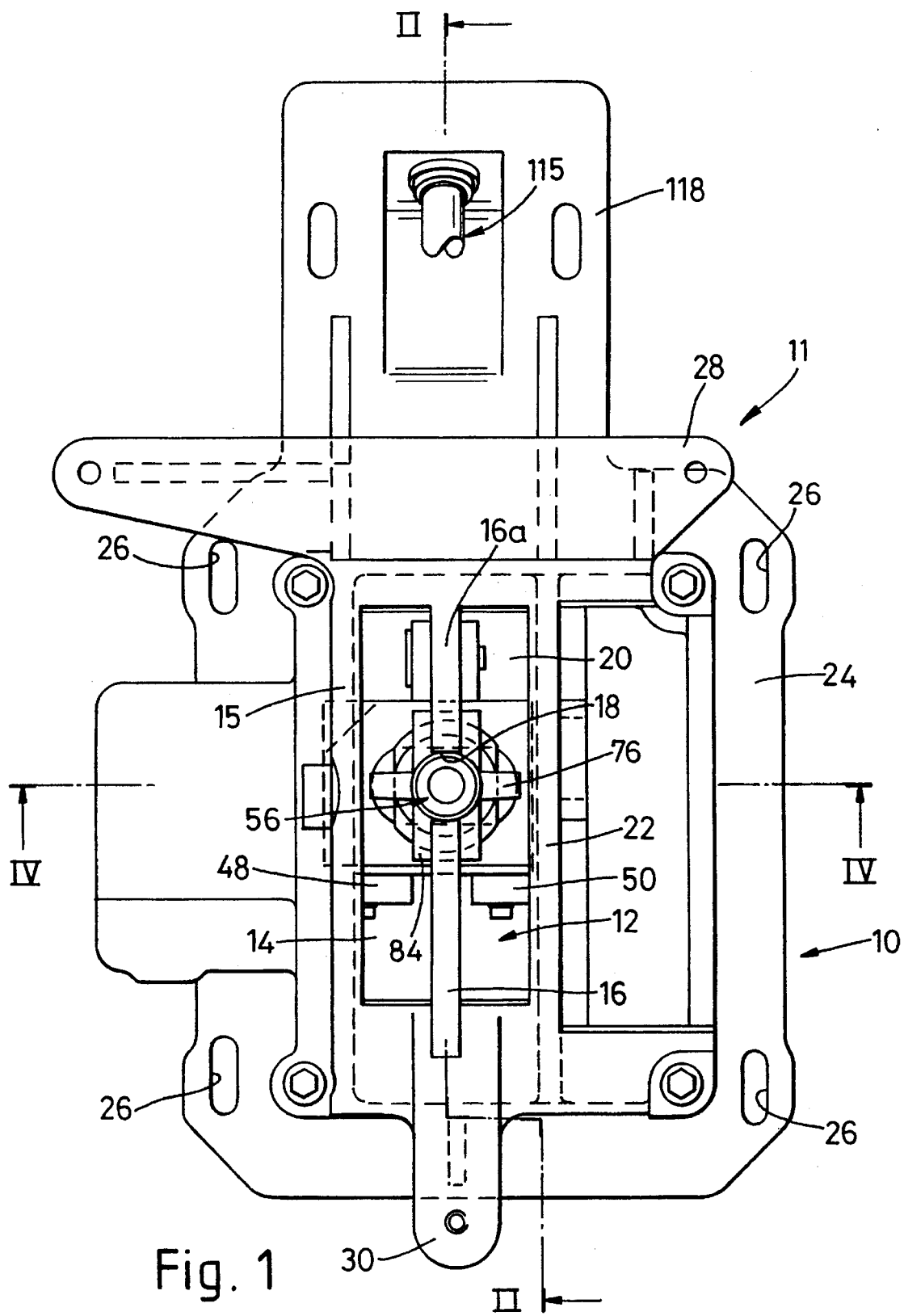
FIG. 1 is a plan view of one embodiment of a part of a selector mechanism in accordance with the invention.
Figures 4, 5:
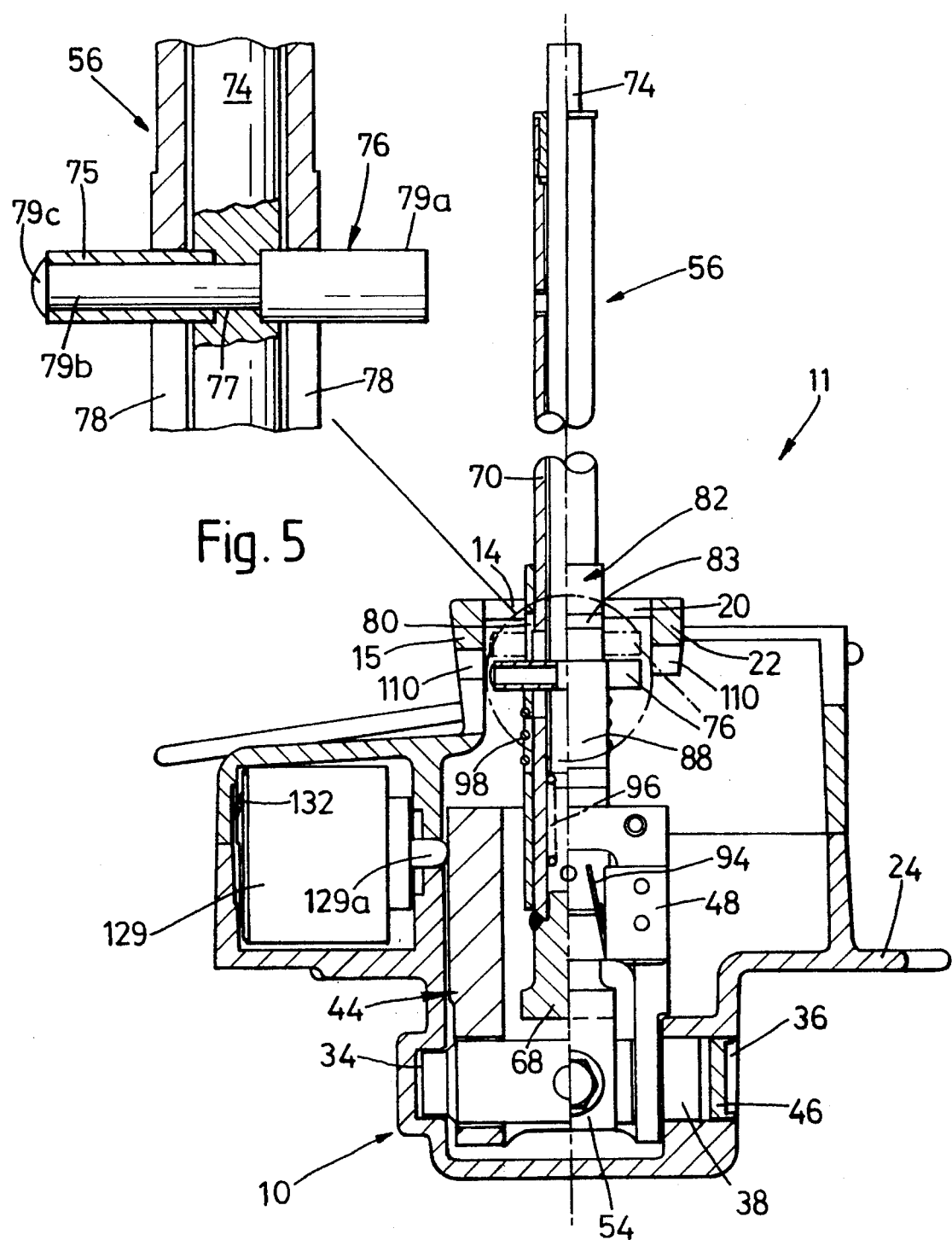
Figure 6:
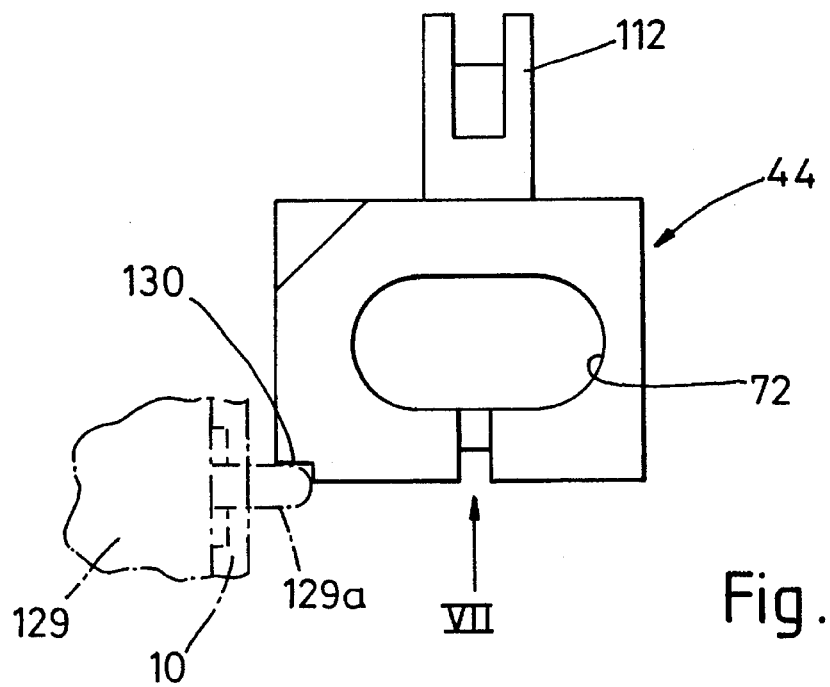
Figure 7:
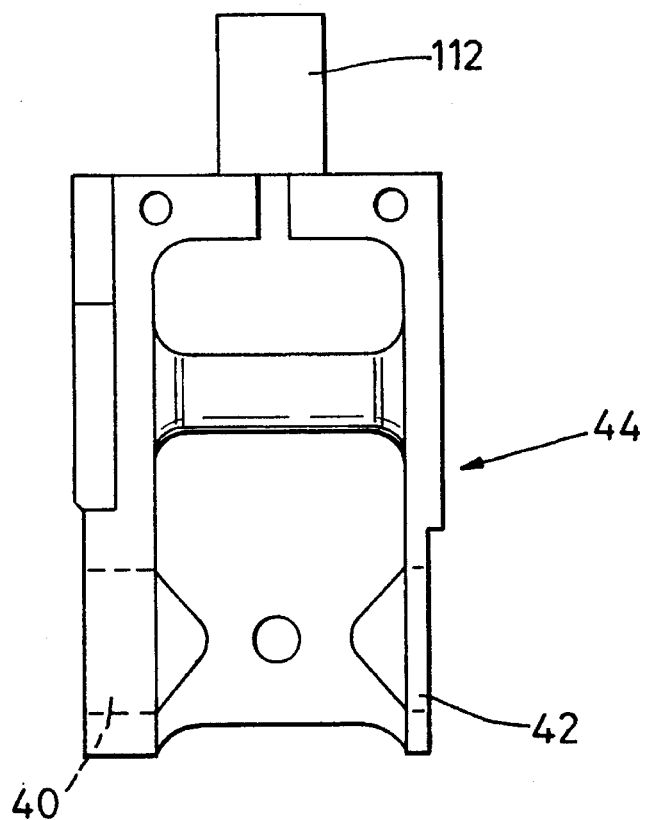
Figure 9:
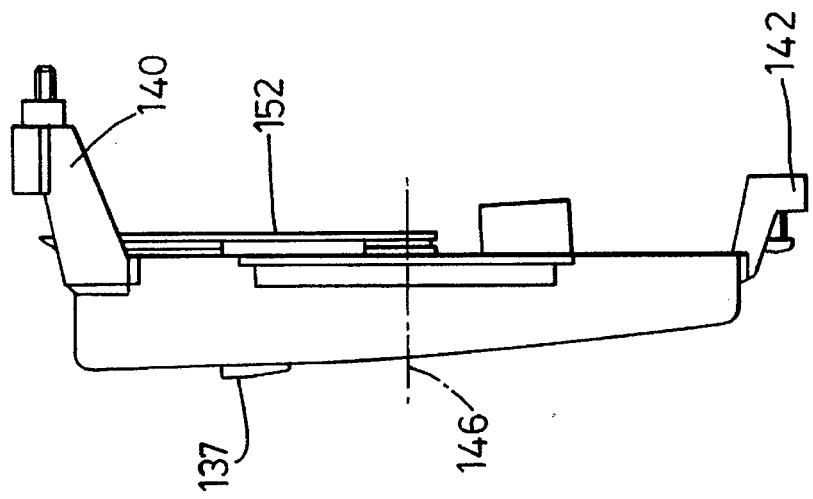
Figure 8:
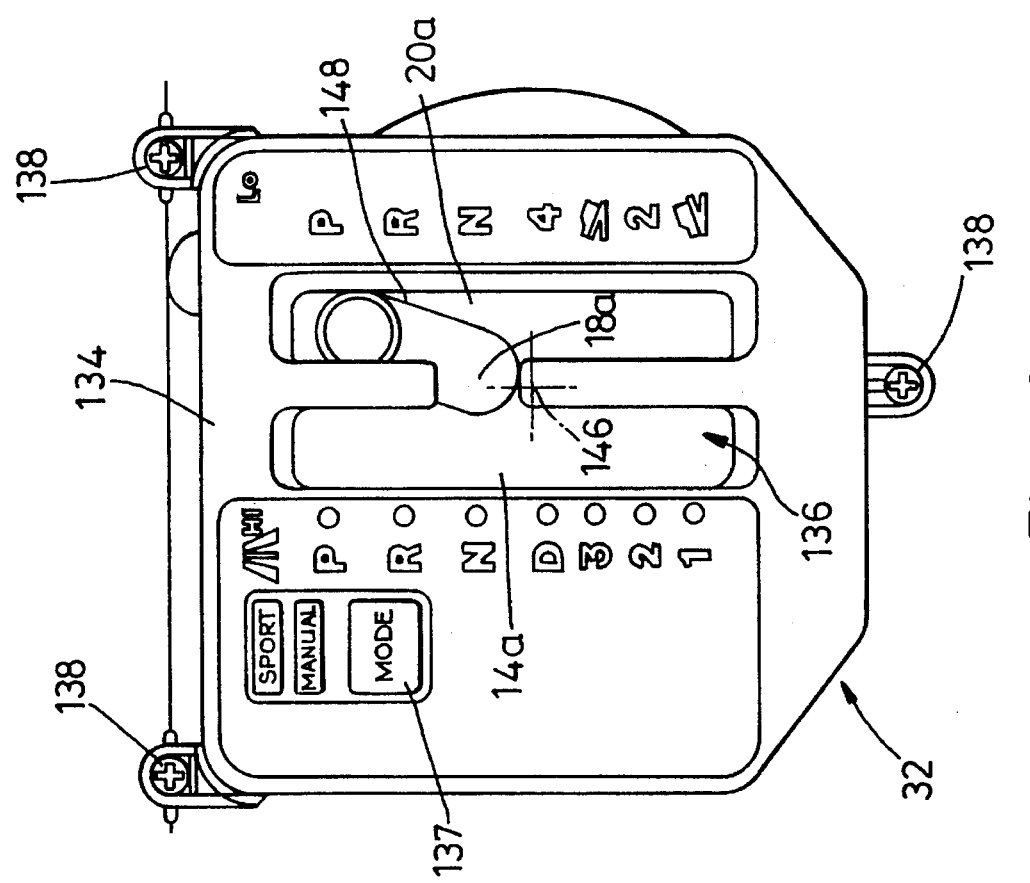
Figure 10:
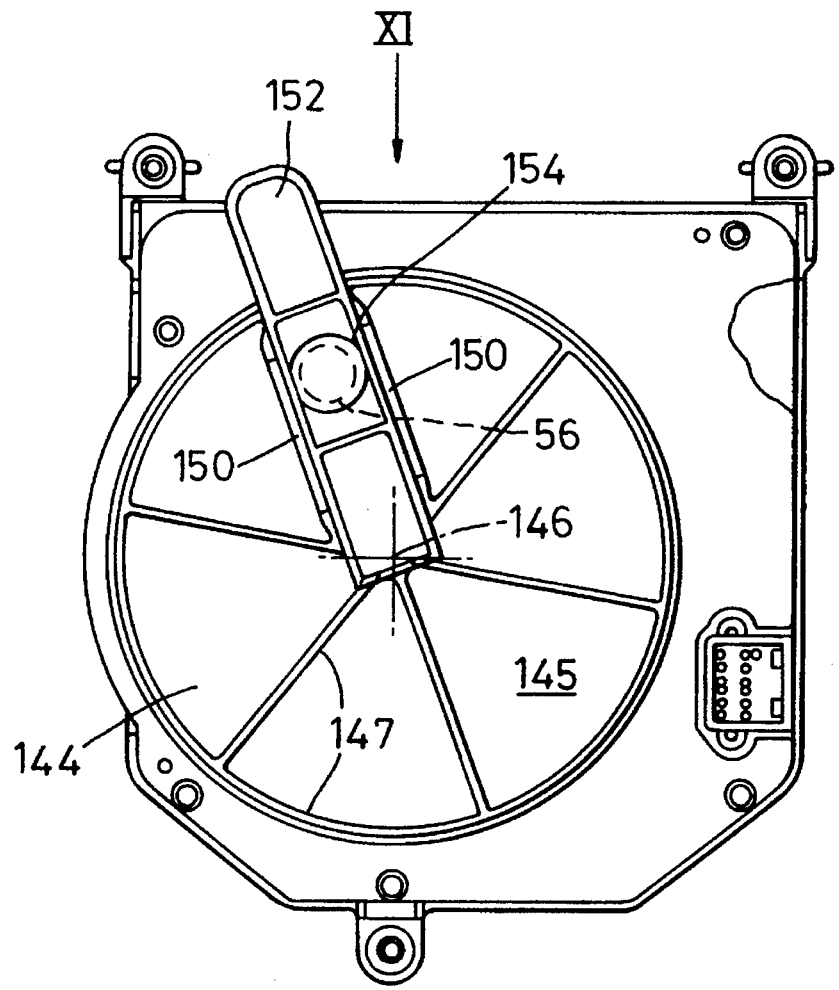
Figure 11:
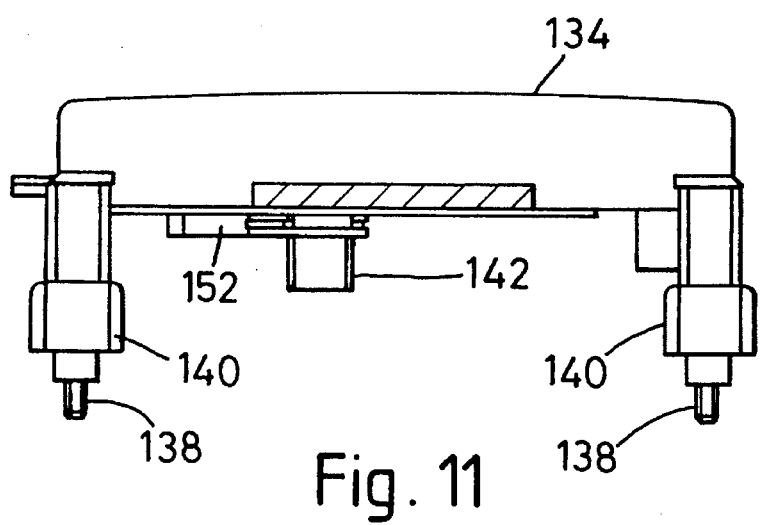
Figure 12:
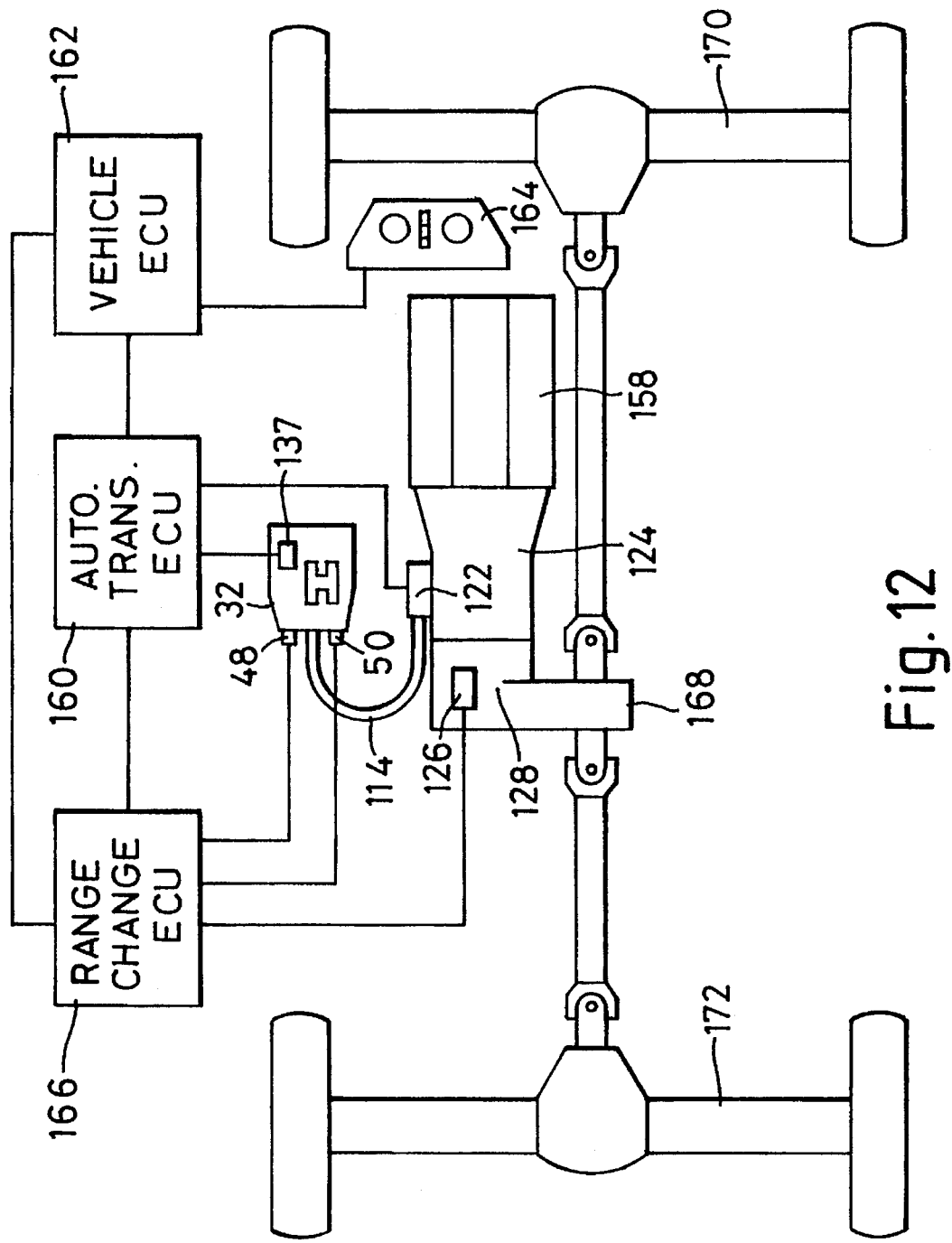

FIG. 3 is a cross-section through part of a vehicle on which the selector mechanism is installed and illustrates cable mounting;

FIG. 4 is a cross-section through the selector mechanism shown in FIG. 1 on the line IV–IV in FIG. 1;

FIG. 5 is a view to a larger scale of an encircled section of the selector mechanism shown in FIG. 4;

FIG. 6 is a plan view of an actuator lever of the mechanism shown in FIGS. 1 to 5;

FIG. 7 is an end view of the actuator lever shown in FIG. 6 looking in the direction of arrow VII in FIG. 6;

FIG. 8 is a plan view of a console shown in FIG. 2;

FIG. 9 is an elevation of the console shown in FIG. 8;

FIG. 10 is an underneath plan view of the console shown in FIGS. 8 and 9;

FIG. 11 is an end view of the console shown in FIG. 10 looking in the direction of arrow XI in FIG. 10; and FIG. 12 is a diagrammatic view of a motor vehicle transmission incorporating the selector mechanism shown in FIGS. 1 to 11 and showing interconnections between the selector mechanism, associated transmissions and controls and indicator devices.

Referring initially to FIGS. 1 to 7, the selector mechanism, indicated generally at 11, has a support or body 10 conveniently formed, e.g., as an aluminium casting, and which defines an H-shaped aperture or gate indicated generally at 12 in FIG. 1. The left-hand limb of the H-shape as shown in FIG. 1 defines a first longitudinal path 14 between an inwardly extending flange 15 and central dividers 16 and 16a. The right hand limb of the H-shape defines a second longitudinal path 20 parallel to the first path 14 and defined between a further inwardly extending flange 22 and the central dividers 16 and 16a. The dividers 16 and 16a define a transverse third path 18 between adjacent ends thereof forming a transverse limb of the H-shape. The flanges 15, 22 and the dividers 16 and 16a are formed integrally with the body 10.

The body 10 is integral with a peripheral mounting flange 24 formed with mounting holes 26 by means of which the body is mounted on a vehicle. The body 10 is also formed with mounting brackets 28, 30 for a console 32 shown in FIGS. 8 to 10 and shown diagrammatically in FIG. 2.

The body 10 has a blind bore 34 (FIG. 4) coaxial with a larger bore 36. The bores 34 and 36 locate a pivot shaft 38 which passes through aligned bores 40 and 42 (FIG. 7) in an actuator lever 44, the larger bore 36 being closed by an insert 46. Two microswitches 48 and 50 are carried by the actuator lever 44 and are arranged one each side of the dividers 16 and 16a.

The pivot shaft 38 is formed with a flat bottomed recess 52 in which is located a rectangular section lug 54 at the lower end of a selector lever 56. A pivot bolt 58 extends through the lug 54, the shaft 38 and the actuator lever 44 and has an extended stepped diameter head 60 on which the lug 54 is rotatably mounted and a threaded shank 62 which passes through the shaft 38 and the actuator lever 44. A shoulder 64 on the head 60 abuts. The bottom surface of the recess 52 to allow the selector lever lug 54 to pivot on the bolt 58. A spring washer 66 biases the lug 54 against the flat bottom of the recess 52.

The lug 54 is formed on a cylindrical end piece 68 which is a spigot location in the lower end of a tubular section 70 of the selector lever 56 where it is retained by welding. The tubular section 70 extends through an elongate opening 72 in the actuator lever 44. An inner rod 74 is axially slidable within the tubular section 70 and carries a transverse latch pin 76 which projects through diametrically opposed axial slots 78 in the tubular section 70. As shown in FIG. 5, the latch pin 76 comprises a stepped diameter pin member 79a–b having an elongate head 79a, a reduced diameter shank 79b inserted through a transverse hole 77 extending between flats on the inner rod 74 and a tube 75 of the same outer diameter as the elongate head 79a retained on the shank by a riveted head 79c.

The latch pin 76 also projects through elongate slots 80 in a blocking member 82 which is slidably mounted on the tubular section 70. The blocking member 82 has radial projections 83 which are above the latch pin 76 as viewed in FIG. 2 and below these it has shoulders 84 which locate beneath in-turned fingers 86 of a retainer 88. The retainer 88 has a tubular extension 90 which fits on the tubular section 70 and is secured axially in position by a roll pin 92 which projects each side of the selector lever 56 for engagement with operating blades 94 of the microswitches 48 and 50 (one blade 94 being shown in FIG. 4).

A preloaded helical compression spring 96 (conveniently called the detent spring) is arranged between the lower end of the inner rod 74 and the roll pin 92 and biases the inner rod 74 in the direction away from the pivot shaft 38. A second preloaded helical compression spring 98 (conveniently called the blocking spring) is arranged between the retainer 88 and a peripheral shoulder 99 on the blocking member 82 so that the blocking member is also biased in the direction away from the pivot shaft 38.

The upper end of the selector lever 56 carries a handle 100, shown in broken lines in FIG. 2. Selector release means in the form of a trigger lever 102 is pivotally mounted on the handle 100 by a pivot pin 103. As viewed in FIG. 2, the trigger 102 has a forward end 104 which can be gripped by a driver of the vehicle and be raised about the pivot pin 103 so that the rear end of the trigger indicated at 106 can be moved downwards and depress the inner rod 74 against the bias of the detent spring 96.

As viewed in FIGS. 1, 2 and 4, the selector lever 56 is at a central intermediate position in the transverse path 18 and in this condition the inner rod 74 is normally biased by the detent spring 96 into a position where the latch pin 76 abuts the upper end of the slots 78 in the tubular section 70 as shown in FIG. 5. With the trigger 102 released, the blocking member 82 is not in the position shown in FIGS. 2 and 4 since the radial projections 83 abut the undersides of the dividers 16 and 16a, biased by the blocking spring 98 and the shoulders 84 are spaced from the fingers 86 of the retainer 88. In this position the latch pin 76 lies between non-recessed portions of the flanges 15 and 22 as shown in broken lines in FIG. 4 and the selector lever 56 cannot be moved from this position unless the trigger 102 is operated to move the latch pin 76 towards the pivot shaft and clear of the flanges 15 and 22.

When the trigger 102 is raised to depress the inner rod 74 the latch pin 76 moves into abutment with the lower end the slot 80 in the blocking member 82 and the driver of the vehicle can sense that the trigger 102 is being moved up to a positive stop. This is the position of the latch pin 76 as viewed in FIG. 2.

Further squeezing of the trigger 102 towards the handle 100 causes the blocking member 82 to be moved towards the pivot shaft 38 against the bias of the blocking spring 98 so that the radial projections 83 move away from the undersides of the dividers 16 and 16a and the latch pin 76 is clear of the flanges 15 and 22. Pivotal movement of the selector lever clockwise or anticlockwise as viewed in FIG. 4 can then be effected about the pivot bolt 58 to permit movement of the select or lever 56 from one longitudinal path 14 to the other longitudinal path 20 and vice versa along the transverse path 18.

When the selector lever 56 is in one or the other of the longitudinal paths 14 or 20, the latch pin 76 normally locates in a selected one of a number of arcuately spaced recesses 110 in the respective flange 15 or 22, as shown in broken lines in FIG. 2. Squeezing the trigger 102 towards the handle 100 to bring the latch pin 76 into abutment with the lower end of slot the 80 in the blocking member 82 causes the latch pin to be positioned clear of the recesses 110 and enables the selector lever 56 and pin of shaft 38 to be pivoted clockwise or anticlockwise as viewed in FIG. 2. Some of the recesses may be elongated as indicated at 110a to permit limited movement of the selector lever without squeezing the trigger 102.

The radial projections 83 on the blocking member 82 prevent movement of the selector lever from one longitudinal path 14 to the other longitudinal path 20 and vice versa through the transverse path 18. Once the rod 74 is fully depressed, the radial projections 83 can pass beneath the dividers 16 and 16a and the selector lever 56 can be moved from one longitudinal path 14 to the other through the transverse path 18.

The actuator lever 44 is formed with a bracket 112 connected to the inner cable 114 of a Bowden cable 115 having an outer sheath 116 connected to an extension 118 of the body 10. The other end of the inner cable 114 is connected to an operating switch 122 (see FIG. 12) of an automatic transmission or gearbox 124, the outer sheath 116 being attached to a bracket 120 of the transmission 124.

The microswitches 48 and 50 are used in the control of a ratio-change actuator 126 in a range change transmission 128 drivingly coupled to the automatic transmission 124 as will be described later.

The body 10 houses a solenoid 129 which has spring loaded locking pin 129a which can co-operate with a surface 130 on the actuator lever 44 as later described. The solenoid 129 is held firmly in position in the body 10 by a Belleville washer 132 interposed between the body and the solenoid.

Referring more particularly to FIGS. 8 to 11, the console 32 comprises a cover panel 134 formed with an H-shaped opening 136 corresponding to the H-shape gate 12 formed by the paths 14, 18 and 20. In FIG. 8, the H-shaped opening 136 comprises a first slot 14a, a second slot 20a and a transverse third slot 18a. The panel 134 carries lettering corresponding to the shift positions of the automatic transmission 124, these being typical, i.e. P,R,N,D etc. The shift positions correspond to the positions of selector lever 56 determined by the recesses 110 and 110a in the flanges 15 and 22, the recesses, together with the latch pin 76, acting as a detent mechanism for locating the selector lever.

The panel 134 also carries a mode selection switch 137. The console 32 is attached to the brackets 28, 30 on the body 10 by means of screws 138 which pass through mounting lugs 140, 142 on the console. The other side of the panel 134 supports a circular blind 144 rotatable about an axis 146. The blind has a flat disc-like web 145 with radial and peripheral stiffeners 147. The blind 144 extends beneath the H-shaped opening 136 so as to obscure the remainder of the selector mechanism disposed beneath it and has a radial slot 148. Two parallel guides 150 are positioned on the underside of the blind 144 adjacent the edges of the slot 148 and slidably support an elongate cover plate 152 having an aperture 154 which receives the selector lever 56 with working clearance as shown in broken lines in FIG. 10.

As the selector lever 56 is moved through the paths 14, 18 or 20, the blind 144 is moved by the cover plate 152 and rotates freely about the axis 146 to accommodate the linear movement of the selector lever. At the same time, the cover plate 152 slides radially within the guides 150. In that way, the combination of the blind 144 and the cover plate 152 continue to virtually completely obscure the body 10 and associated components so that they are not visible to the user of vehicle and are protected from dust and debris. As an alternative construction, the slot 148 may be arcuate and the cover plate formed as a sector pivoted about an axis parallel to but radially offset from the axis 46 of rotation of the blind 144.

Referring again to FIG. 12, the automatic transmission 124 is driven by an engine 158 and is controlled by an automatic transmission electrical control unit or ECU 160 connected to the automatic transmission operating switch 122 and to the mode selection switch 137. A further ECU 162 controls other vehicle electronics including vehicle instrumentation 164 and indicator lights in the console 32. The range-change transmission 128 has a separate range-change ECU 166. As described above, the selector mechanism 11 is mechanically connected to the automatic transmission operating switch 122 by the Bowden cable 115. The switch 122 is on the automatic transmission 124 to allow a direct mechanical connection to a park mechanism in the transmission. The microswitches 48 and 50 are connected electrically to the range-change ECU 116 which is also connected to the ratio-change actuator 126, the vehicle ECU 162 and the automatic transmission ECU 160.

The selector mechanism 11 is shown for use in a four-wheel drive vehicle where the range-change transmission 128 is incorporated with a transfer gearbox 168 used to split the transmission output to front and rear axles 170 and 172.

Operation of the selector mechanism in use on the vehicle will now be described.

With the selector lever 56 in one of the longitudinal paths 14 or 20 and the latch pin 76 located in the respective recess 110 which corresponds to the park position (P), the locking pin 129a of the solenoid 129 is spring loaded against surface 130 of the actuator lever as shown in FIG. 6. In that position, even if trigger 102 is lifted to disengage the latch pin 76 from the Park recess, the locking pin 129a prevents the selector lever 56 being moved from the park position. However, when the foot brake of the vehicle is applied, an electrical signal is sent to the solenoid 129 to withdraw the locking pin 129a. It is then possible to move the selector lever 56 out of the Park position. By manipulating the trigger 102, the selector lever 56 can then be moved into the desired position and the movement of the cable 114 by the actuator lever 44 will be transmitted to actuate the automatic transmission switch 112. The position of the switch 112 is sensed by the automatic transmission ECU 160 and the instrumentation 164 indicates to the driver the shift position selected.

When the latch pin 76 reaches the lower end of the slots 80 in the blocking member 82, the blocking member, under the preload of the blocking spring 98, acts as a stop to indicate to the driver than the trigger 102 has been moved by an amount sufficient to enable the selector lever to be moved along the longitudinal paths 14 or 20, the blocking member also acting as a releasable blocking means to prevent movement of the selector lever (56) along the transverse path (18) to effect a range-change.

The vehicle transmission is intended for a vehicle which is equally suited to on-road or off-road conditions. The first path 14 is normally used for normal road driving when the mode selection switch 136 can be used by the driver to select a sport driving mode or a manual mode as alternatives to the standard or default mode. Operation of the mode selection switch 137 is sensed by the automatic transmission ECU 160 so that if, for example, the sport mode is selected, the automatic transmission ECU maintains the automatic transmission 124 in lower ratios for longer before changing to higher ratios. When the mode selection switch 137 is used to select the manual mode, the selection of shift positions 1, 2, 3 by the driver causes the automatic transmission to upshift sequentially to corresponding transmission ratio to hold that particular ratio.

To select a different range, it is necessary to move the selector lever 56 through the transverse path 18. To do that, the selector lever 56 is first moved to the neutral shift position (indicated a N on the panel 134) which is the point in the longitudinal path 14 or 20 which coincides with the intersection with the transverse path 18. The trigger 102 is then fully lifted to ensure that the radial projections 83 clear the dividers 16 and 16a to permit the selector lever to move through the transverse path 18 and into the new path 14 or 20. During such movement through the transverse path 18, the microswitches 48 and 50 operate to signal the range-change ECU 166 to effects a change from one range to the other in the range-change transmission 128.

To facilitate towing of the vehicle, the selector lever 56 can be moved to the intermediate position along the transverse path 18 as shown in FIG. 4 and the trigger 102 released to allow the latch pin 76 to move to the upper position as shown in FIG. 5 and as shown chain dotted in FIG. 4. The ends of the latch pin 76 are now flanked by the flanges 15 and 22 so that the latch pin maintains the selector lever in the intermediate position. In that position, the transmissions 124, 128 will be held in neutral and the vehicle can be towed. Alternatively, a connection in the range-change ECU 166 can be effected by means not normally accessible to the driver (e.g. by inserting a fuse) to put the range-change transmission into neutral. Where this is the only means of selecting neutral in the range-change transmission 128, one of the microswitches 48 or 50 may be omitted.

The H-shaped opening 136 in the console 32 does not normally effect any guiding of the selector lever 56 as the guiding is by the gaze 12 in the body 10. Hence, the console 32 can be made of a lightweight plastics materials.

The selector mechanism 11 can be used on right hand drive or left hand drive vehicles. For a drive of opposite hand, the console 32 and the body 10 will be substantially a mirror image of that shown, the brackets 28, 30 on the body 10 being disposed accordingly.

The trigger lever 102 may be replaced by any other convenient form of selector release means, e.g., a push button on the end of a T-shaped knob or a sliding collar on the selector lever. A separate release means may be provided to enable the selector lever to be moved from the fist pat to the second path and vice-versa.

Although the invention has been described in detail with reference to a particular selector mechanism, it will be appreciated that other selector mechanisms may be used and which embody the invention. For example, the selector lever may be pivoted on a ball and constrained to move in the required paths by plungers or rails in any of the ways common to the gear lever mechanisms of manual change speed gearboxes used on motor vehicles. Similarly, the means of blocking movement from one longitudinal path to the other through the transverse path may be adapted from those commonly used to prevent inadvertent selection of reverse gear in such manual gearboxes. Equally, movement of the selector lever in the longitudinal paths may be restricted by any of the detent means common to selector mechanisms for automatic transmissions, including paths which have chicanes or zig-zag formations which need a lateral effort on the lever before further longitudinal movement is allowed.

We claim:

1. A selector mechanism for a vehicle transmission which comprises an automatic transmission drivingly coupled to a range-change transmission having first and second selectable ranges, the selector mechanism comprising:

a support;

a driver operable selector lever constrained by the support for movement along a first path for shift selection in the automatic transmission with the first range of the range-change transmission selected, along a second path substantially parallel to the first path for shift selection in the automatic transmission with the second range of the range-change transmission selected and along a third path transverse to the first and second paths whereby movement of the selector lever along the transverse path effects a change from one range to the other in the range-change transmission;

a detent mechanism for locating the selector lever at positions in the support corresponding to selected shift positions;

selector release means on the selector lever and movable to disengage the detent mechanism;

a detent spring which cooperates with the selector release means such that the selector release means requires movement against the bias of the detent spring when disengaging the detent mechanism; and a blocking spring which cooperates with the selector release means such that the selector release means requires further movement against the bias of the blocking spring after overcoming the bias of the detent spring to enable the selector lever to be moved along the transverse path to effect a range-change.

2. The selector mechanism of claim 1 wherein the detent mechanism comprises a latching member carried by the selector lever and which is locatable in a series of recesses in the support to hold the selector lever in a required shift position, operation of the selector release means being arranged to disengage the latching member from one recess so as to permit relocation thereof in another recess.

3. The selector mechanism of claim 1 wherein a stop is provided to indicate that the selector release means has been moved against the bias of the detent spring by an amount sufficient to enable the selector lever to be moved along the first or the second path.

4. The selector mechanism of claim 3 wherein the stop is movable against the bias of the blocking spring by continued operation of the selector release means to enable the selector lever to be moved along the transverse path to effect a range-change.

5. The selector mechanism of claim 1 and further comprising a blocking member for cooperation with a surface of the support to prevent movement of the selector lever along the transverse path and the blocking member is movable by the selector release means to a position in which blocking member clears the said surface to permit movement of the selector lever along the transverse path.

6. The selector mechanism of claim 5 wherein a neutral condition can be selected in the range-change transmission by positioning the selector lever at an intermediate position along the transverse path.

7. The selector mechanism of claim 6 wherein means is provided for optionally maintaining the selector lever in an intermediate position along the transverse path.

8. The selector mechanism of claim 7 wherein the means for optionally maintaining the selector lever in the intermediate position along the transverse path is arranged to lie between two surfaces of the support in which are formed recesses corresponding to shift positions of the selector lever when in the first and second paths.

9. The selector mechanism of claim 4 wherein release means is operable by the driver to move the said means for optionally maintaining the selector lever in the intermediate position to a position in which it allows the selector lever to move out of the intermediate position and into the first or second path.

10. The selector mechanism of claim 1 wherein the transverse path intersects the first and second paths at positions coincident with a neutral shift position for the automatic transmission.

11. The selector mechanism of claim 1 wherein releasable blocking means is operable to prevent movement of the selector lever from one of said first and second paths and along the transverse path to effect a range-change.

12. The selector mechanism of claim 1 and further comprising a cover having an opening corresponding substantially to the shape of the paths and a movable blind adjacent to and arranged to obscure the opening, the selector lever extending through the opening and the blind and being arranged to rotate the blind as the selector lever is moved along the said paths.

13. The selector mechanism of claim 12 wherein the blind has a substantially radial slot and a plate is slidably mounted on the blind so as to substantially cover the slot, the selector lever extending through an aperture in the plate.

14. The selector mechanism of claim 12 wherein the cover is part of a console having a mode selection switch thereon for selecting transmission modes in the automatic transmission.

15. The selector mechanism of claim 1 and further comprising switch means which is operable when the selector lever is moved from the first path to the second path or vice versa, the switch means being arranged to control the selection of the ranges in the range-change transmission.

16. The selector mechanism of claim 15 wherein said switch means comprises two switches, one of which operates to cause selection of the first range in the range-change transmission when the selector lever is positioned for movement along the first path and the other of which operates to cause selection of the second range in the range-change transmission when the selector lever is positioned for movement along the second path.

17. The selector mechanism of claim 16 wherein both switches are in the same state when the selector lever is positioned at an intermediate position along the transverse path to cause the range-change transmission to select a neutral condition.

18. The selector mechanism of claim 1 wherein releasable stop means is provided on the support for retaining the selector lever in Park position.

* * * * *